United States Patent [19]

Lewis

[11] Patent Number: 5,186,231
[45] Date of Patent: Feb. 16, 1993

[54] TARPAULIN DEPLOYMENT AND RETRACTION APPARATUS

[76] Inventor: Milburn Lewis, 18418-94th NE., Bothell, Wash. 98011

[21] Appl. No.: 877,086

[22] Filed: May 1, 1992

[51] Int. Cl.$^5$ .............................................. B60P 7/04
[52] U.S. Cl. ................................... 160/310; 160/264; 160/265; 296/98
[58] Field of Search ................. 160/310, 264, 265, 66, 160/68, 274, 275, 276; 296/98, 100

[56] References Cited

U.S. PATENT DOCUMENTS

| | | | |
|---|---|---|---|
| 3,667,802 | 6/1972 | Love | 296/98 |
| 3,829,154 | 8/1974 | Becknell | 296/98 |
| 4,655,010 | 4/1987 | Arquati | 160/66 X |
| 4,909,563 | 3/1990 | Smith | 296/98 |
| 5,050,923 | 9/1991 | Petelka | 296/98 |

*Primary Examiner*—David M. Purol
*Attorney, Agent, or Firm*—Graybeal Jackson Haley & Johnson

[57] ABSTRACT

In summary, the present invention contemplates an improved tarpaulin deployment and retraction apparatus which includes a plurality of removable or permanent tracks installed at intervals over the load carrying compartment of a vehicle. A leading edge slider travels to and fro on the tracks under the influence of deployment/retraction mechanism. A ridgepole slider is towed to a mid-deployment position due to a latch on the ridgepole slider engaging a towing pin on the leading edge slider. Upon reaching the mid-deployment position, a de-coupling pin upon each of the tracks cooperates with a camming surface on the latch to disengage the ridgepole slider from the leading edge slider. The leading edge slider then is further urged to a fully deployed position. A leading edge pole, to which is attached the leading edge of a tarpaulin, is connected to the leading edge sliders on the tracks. As the sliders are urged into their deployed positions the tarpaulin is unfurled from its stowed position. A ridgepole connected to the ridgepole sliders creates a pitch in the deployed tarpaulin. Upon retraction, the tarpaulin is furled by the deployment/retraction mechanism. The furling action of the tarpaulin urges the leading edge slider towards a stowed position during which the leading edge slider comes in contact with the ridgepole slider. The respective pairs of sliders on each track are then further urged towards a fully retracted or stowed position.

11 Claims, 3 Drawing Sheets

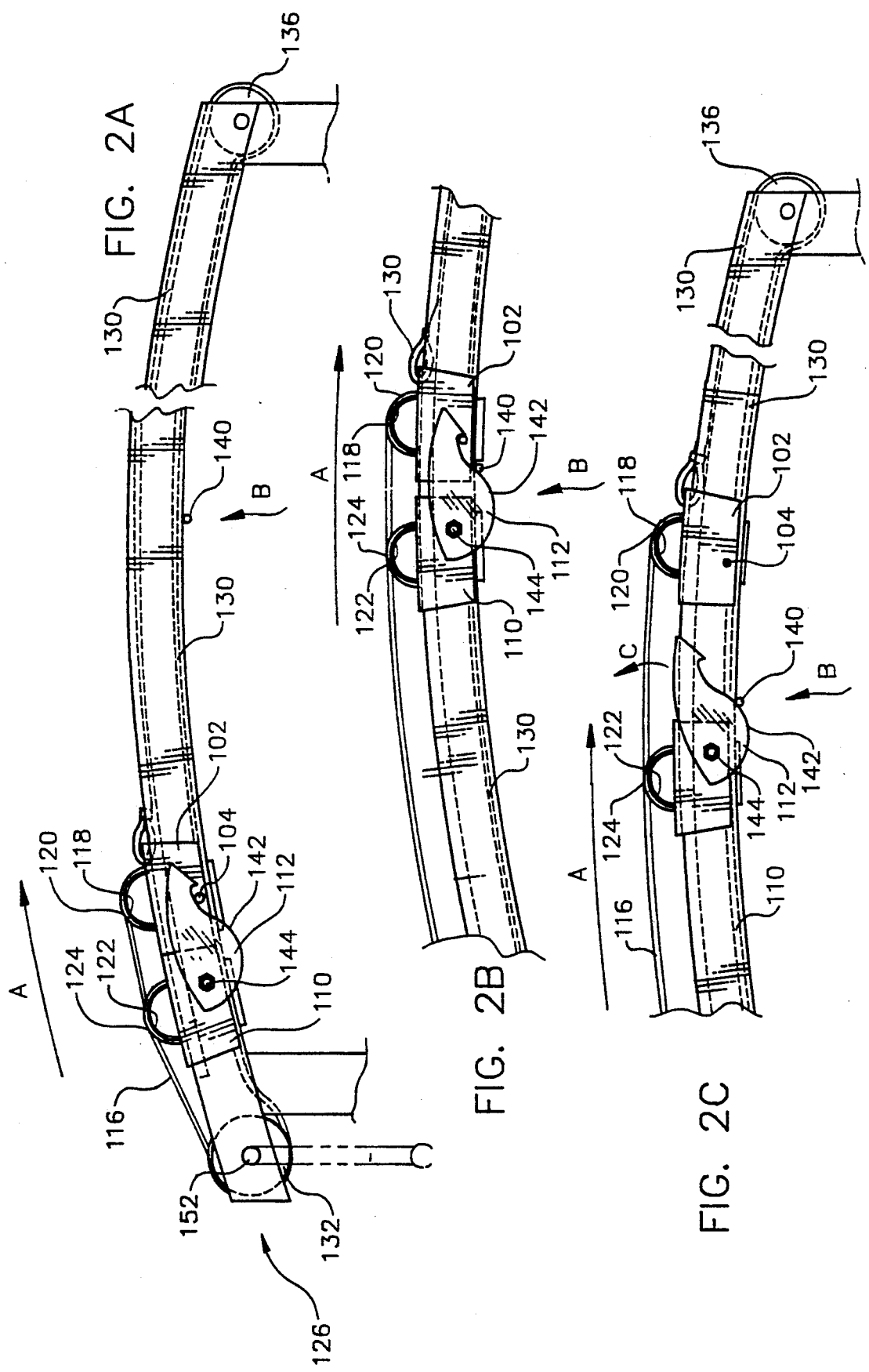

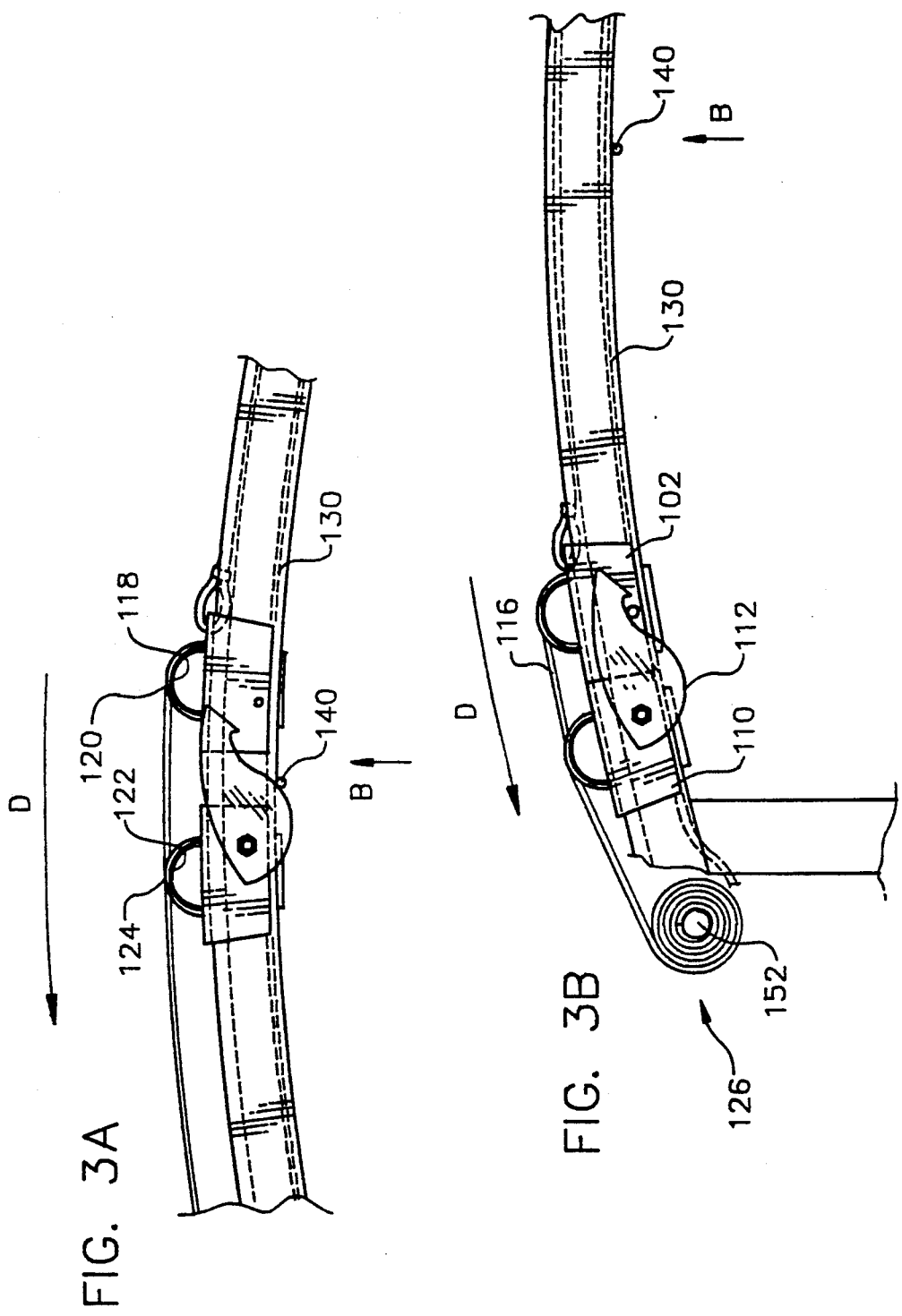

TARPAULIN DEPLOYMENT AND RETRACTION APPARATUS

BACKGROUND OF THE INVENTION

A variety of trucks and trailers are used to transport material such as earth, woodchips or packaged products. To prevent such materials from becoming waterlogged or otherwise damaged by rain water, it is desireable to cover the load carrying portion of the transport vehicle with a tarpaulin. Also, for obvious safety reasons it is desireable to cover loads of materials to prevent spillage during transport which can present hazardous conditions to other users of the roadways, such as in the case of dumptrucks hauling earth and rock to and from construction sites. Furthermore, in the case of lightweight materials, such as woodchips or sawdust, that are readily conveyed into the slipstream surrounding a moving vehicle, it is desirable to cover the load to prevent loss of product which can be substantial on longer trips at freeway speeds.

It is not uncommon to see a tarpaulin tied down with ropes or the like over the bed of a truck or the dumpbox on a dumptruck in an attempt to remedy the problems described above. However, there are drawbacks associated with this approach. First, it can be quite inconvenient and difficult to spread out the tarpaulin in the first place, especially on tall trucks, so it is common to see trucks with tarpaulins left in a stowed position by the user. Secondly, worn ropes or poorly tied knots can result in the tarpaulin becoming partially or completely pulled away from its moorings. This potential result is dangerous in its own right where a wildly flapping or completely free tarpaulin can distract other drivers o otherwise interfere with their driving. Thirdly, no effective method for providing a pitch to the tarpaulin to encourage rainwater runoff is known that does not interfere with the deployment or retraction of the tarpaulin or result in pooling of rainwater.

SUMMARY OF THE INVENTION

In summary, the present invention contemplates an improved tarpaulin deployment and retraction apparatus which includes a plurality of removable or permanently installed tracks at intervals over the load carrying compartment of a vehicle. On each of the tracks a leading edge slider travels to and from on the tracks under the influence of deployment/retraction mechanism. A ridgepole slider is towed to a mid-deployment position due to a latch on the ridgepole slider engaging a towing pin on the leading edge slider. Upon reaching the mid-deployment position, a decoupling pin upon each of the tracks cooperates with a camming surface on the latch to disengage the ridgepole slider from the leading edge slider. The leading edge slider then is further urged to a fully deployed position. A leading edge pole, to which is attached the leading edge of a tarpaulin, is connected to the leading edge sliders on the front and rear tracks. As the sliders are urged into their deployed positions the tarpaulin is unfurled from its stowed position. A ridgepole connected to the ridgepole sliders creates a pitch in the tarpaulin at the mid-deployment position. Upon retraction, the tarpaulin is furled by the deployment/retraction mechanism. Furling the tarpaulin urges the leading edge slider towards a stowed position during which the leading edge slider comes in contact with the ridgepole slider. The respective pairs of sliders on each track are then further urged towards a fully retracted or stowed position.

BRIEF DESCRIPTION OF THE DRAWINGS

FIG. 2A is a depiction of the slider and latching mechanism approaching being urged away from the stowed position position.

FIG. 2B is a depiction of the decoupling of the sliders at the mid-deployment position.

FIG. 2C is a depiction of the leading edge slider moving towards the fully deployed position.

FIG. 3A is a depiction of the leading edge slider approaching contact with the ridgepole slider upon retraction.

FIG. 3B is a depiction of sliders moving in tandem towards the stowed position.

DETAILED DESCRIPTION OF A PREFERRED EMBODIMENT

Figure 1:
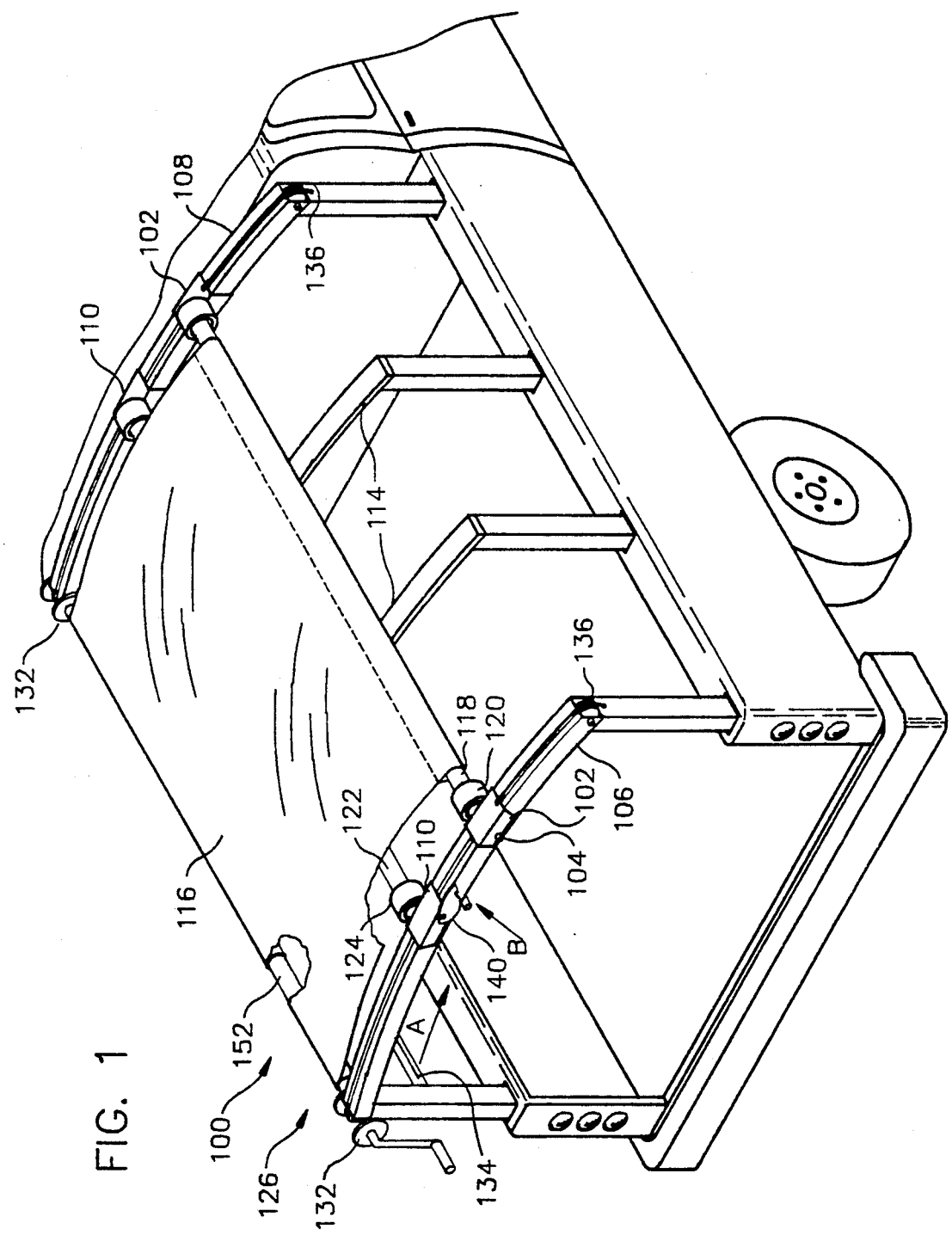
FIG. 1 is a drawing depicting the claimed tarpaulin deployment/retraction apparatus installed over the bed of a truck.

Referring to FIG. 1, the present invention comprises a tarpaulin deployment and retraction apparatus 100, shown mounted on a conventional pickup truck, which includes leading edge sliders 102 with horizontally extending towing pins 104. The leading edge sliders 102 travels upon front and rear tracks 106 and 108 respectively. A set of ridgepole sliders 110 with a latch 112 also travel upon tracks 106 and 108. It should be noted that vehicles with cargo carrying compartments longer than on the truck depicted in FIG. 1 will typically have more than two tracks. For instance, a 40 foot semi-trailer rig may utilize four or more tracks with sliders. The structure further includes hoop members 114 for supporting tarpaulin 116 when the tarpaulin is deployed. The leading edge of tarpaulin 116 is attached to leading edge pole 118 which is in turn connected to the leading edge sliders 102 via leading edge pole receptacles 120. Similarly, a ridgepole 122 is connected to the ridgepole sliders 110 via ridgepole receptacles 124.

To effect deployment of tarpaulin 116 from a furled or stowed position, the manually powered deployment/retraction means 126, which includes drums 132 attached at both ends of takeup reel 152, winds cables 130 upon drums 132. Deployment/retraction means 126 may alternatively be powered electrically, hydraulically or pneumatically, Referring now to FIGS. 2A. (Note: only one track and set of sliders is depicted, but both ends operate in the same manner.) Cables 130 pass from drums 132 through the interior of track 106 then around pulleys 136 and back along the upper surface of track 106 until they terminate at a connection with leading edge sliders 102. Referring back to FIG. 1, as cables 130 are wound upon drums 132, leading edge sliders 102 are urged along track 106 away from the stowed position. Leading edge pole 118, which moves with leading edge sliders 102, essentially drags tarpaulin 116 in direction "A" until it reaches the fully deployed position.

Referring to FIG. 2A. Upon deployment the leading edge slider 102 tows ridgepole slider 110 in direction "A" via towing pin 104 by cooperating with latch 112. Referring now to FIG. 2B. As the pair of sliders reaches mid-deployment position "B", decoupling pin 140 comes in contact with camming surface 142 on latch 112. Referring now to FIG. 2C. Further motion of the sliders 102 and 110 in direction "A" results in decoupling pin 140 forcing latch 112 to rotate about pivot 144 in direction "C" to decouple ridgepole slider 110 from leading edge slider 102 which prevents further motion of ridgepole slider 110 in direction "A".

Referring again to FIG. 1. To stow or furl tarpaulin 116, deployment/retraction means 126 operates to cause takeup reel 152 to wrap tarpaulin 116 upon it as shown in FIG. 3B (Note: drum 132 is not shown to better illustrate the furled tarpaulin upon the takeup reel). Referring now to FIG. 3A. Movement of tarpaulin 116 in direction "D" due to the furling action urges leading edge pole 118, and consequently leading edge slider 102 towards ridgepole slider 110 which is resting near mid-deployment position "B". Referring again to FIG. 3B. Following contact between the sliders 102 and 110, they continue to move in tandem in direction "D" as tarpaulin 116 is further furled upon takeup reel 152.

Referring to FIG. 1. The motion of ridgepole sliders 110 during deployment as described above, brings ridgepole 122 into near alignment with mid-deployment position "B". With ridgepole 122 in such a position beneath tarpaulin 116, the necessary pitch to facilitate rainwater runoff is provided. A preferred embodiment may also include one or more hoop members 114 interposed between and substantially parallel to front and rear tracks 106 and 108 to further support tarpaulin 116 when in its deployed position.

In summary, an improved tarpaulin deployment and retraction apparatus has been described. Accordingly, other uses and modifications of the present invention will be apparent to persons skilled in the art without departing from the spirit and scope of the present claimed invention.

I claim:

1. An improved tarpaulin deployment and retraction apparatus comprising:
   a leading edge slider, the leading slider including a towing pin;
   a ridgepole slider, the ridgepole slider including means for latching;
   a first track, the first track including a fixed pin interposed between the ends of the first track
   a second track;
   a tarpaulin with a leading edge and a winding edge;
   a ridge pole wherein one end of the ridge pole is restrained in a portion of the ridgepole slider and the other end is supported in the region of the second track;
   a leading edge pole wherein one end of the leading edge pole is restrained in a portion of the leading edge slider, the leading edge of the tarpaulin is proximately joined therewith and the other end of the leading edge pole is supported in the region of the second track;
   deploying means for urging the leading edge slider along the first track from a stowed position with the towing pin cooperating with the latching means to tow the ridgepole slider along the first track until the latching mechanism engages the fixed pin whereby the ridgepole slider is decoupled from the leading edge slider and engages the fixed pin, and the deploying means further urges the leading edge slider towards a fully deployed position; and
   retraction means for urging the winding edge of the tarpaulin into a stowed position, urges the leading edge slider towards the stowed position, the towing pin with the latching means cooperates to decouple the ridgepole slider from the fixed pin, the further movement of the leading edge slider urging the ridgepole slider towards a fully stowed position by contact between adjacent portions of the sliders.

2. The appartus of claim 1 where the deploying means and the retraction means includes:
   a motor.

3. The apparatus of claim 1 which further includes a tarpaulin support means.

4. The apparatus of claim 3 wherein the tarpaulin support means includes:
   a hoop interposed between and substantially parallel with the first and second tracks for supporting the tarpaulin when in the deployed position.

5. The apparatus of claim 1 wherein the latching means includes:
   a pivoting hook portion and a camming surface for cooperating with the fixed pin and the towing pin.

6. An improved apparatus for deploying and retracting a tarpaulin comprising:
   a leading edge slider including a towing pin;
   a ridgepole slider including a latch means;
   a guide track including a decoupling pin;
   a deploying means for urging the leading edge slider along the guide track to unfurl an attached tarpaulin, the towing pin acts upon the ridge pole slider latch means to tow the ridge pole slider into a desired position determined by the position of the de-coupling pin which cooperates with the latch means to decouple the sliders; and
   a retraction means for acting upon the attached tarpaulin to urge the towing slider along the guide track towards a stowed position during which the towing pin cooperates with, the latch means to disengage the ridgepole slider from the decoupling pin and further urge both sliders towards the stowed position.

7. The appartus of claim 6 wherein the deploying means and the retraction means include: a motor.

8. The apparatus of claim 6 which further includes a tarpaulin support means.

9. The apparatus of claim 8 wherein the tarpaulin support means includes: a hoop interposed adjacent and substantially parallel to the guide track.

10. The apparatus of claim 6 wherein the latch means includes: a pivoting hook portion and a camming surface for cooperating with the decoupling pin and the towing pin.

11. The apparatus of claim 6 further including:
    a ridge pole wherein one end of the ridge pole is restrained within a portion of the ridge pole slider;
    a leading edge pole wherein one end of the leading edge pole is restrained withing a portion of the leading edge slider and an edge of the tarpaulin is joined to the leading edge pole, whereby the towing slider acting upon the leading edge pole unfurls the tarpaulin during action of the deploying means; and
    a support track substantially parallel to the guide track for supporting the ends of the ridge pole and the leading edge pole opposite their respective sliders.

* * * * *